(12) United States Patent
Chayat et al.

(10) Patent No.: US 10,225,183 B2
(45) Date of Patent: Mar. 5, 2019

(54) SYSTEM AND METHOD FOR VIRTUALIZED RECEIVE DESCRIPTORS

(71) Applicant: Intel Corporation, Santa Clara, CA (US)

(72) Inventors: Ronen Chayat, Haifa (IL); Andrey Chilikin, Limerick (IE); John J. Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 42 days.

(21) Appl. No.: 15/170,138

(22) Filed: Jun. 1, 2016

(65) Prior Publication Data

US 2017/0353384 A1 Dec. 7, 2017

(51) Int. Cl.
*H04L 12/28* (2006.01)
*H04L 12/721* (2013.01)

(52) U.S. Cl.
CPC .................. *H04L 45/566* (2013.01)

(58) Field of Classification Search
CPC ..... H04L 12/28; H04L 12/4641; H04L 41/12; H04L 41/0896; H04L 49/3046; H04L 47/00; H04L 67/10; H04L 61/00
See application file for complete search history.

(56) References Cited

U.S. PATENT DOCUMENTS

| | | | |
|---|---|---|---|
| 2008/0008202 A1* | 1/2008 | Terrell | H04L 45/00 370/401 |
| 2017/0104679 A1* | 4/2017 | Sunavala | G06F 9/45558 |
| 2017/0126792 A1* | 5/2017 | Halpern | H04L 41/0896 |
| 2017/0149694 A1* | 5/2017 | Lakshmanan | H04L 49/3045 |
| 2017/0288971 A1* | 10/2017 | Jayaraman | H04L 41/12 |

\* cited by examiner

*Primary Examiner* — Mohamed A Kamara
(74) *Attorney, Agent, or Firm* — Patent Capital Group

(57) ABSTRACT

In one embodiment, a system comprises a network interface controller to determine context information associated with a data packet. The network interface controller may select a receive descriptor profile from a plurality of receive descriptor profiles based upon a first portion of the context information and build a receive descriptor for the data packet based upon a second portion of the context information and the selected receive descriptor profile.

25 Claims, 6 Drawing Sheets

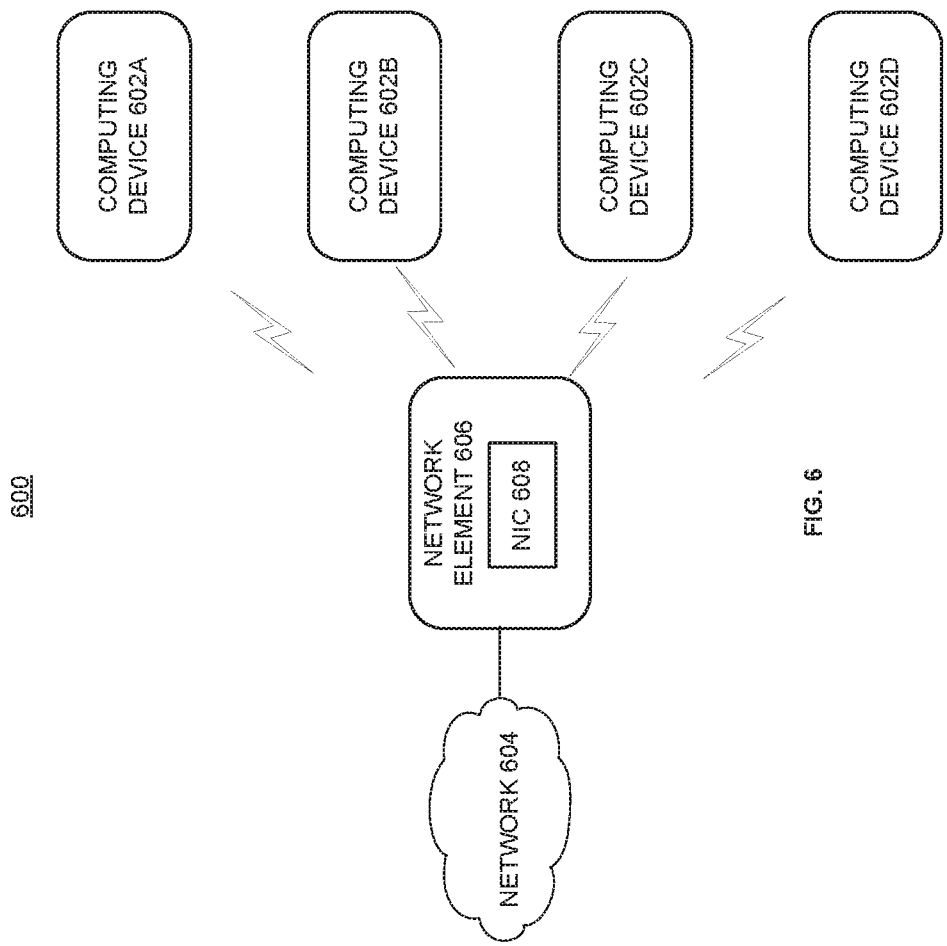

SYSTEM AND METHOD FOR VIRTUALIZED RECEIVE DESCRIPTORS

FIELD

The present disclosure relates in general to the field of computer development, and more specifically, to virtualized receive descriptors.

BACKGROUND

A computer system may include at least one processor, associated memory modules, and a network interface controller providing communication with one or more networks. The network interface controller may receive data packets destined for processes running on the computer system.

BRIEF DESCRIPTION OF THE DRAWINGS

FIG. 6 illustrates a block diagram of a system for providing virtualized receive descriptors in accordance with certain embodiments.

Like reference numbers and designations in the various drawings indicate like elements.

DETAILED DESCRIPTION

Figure 1:
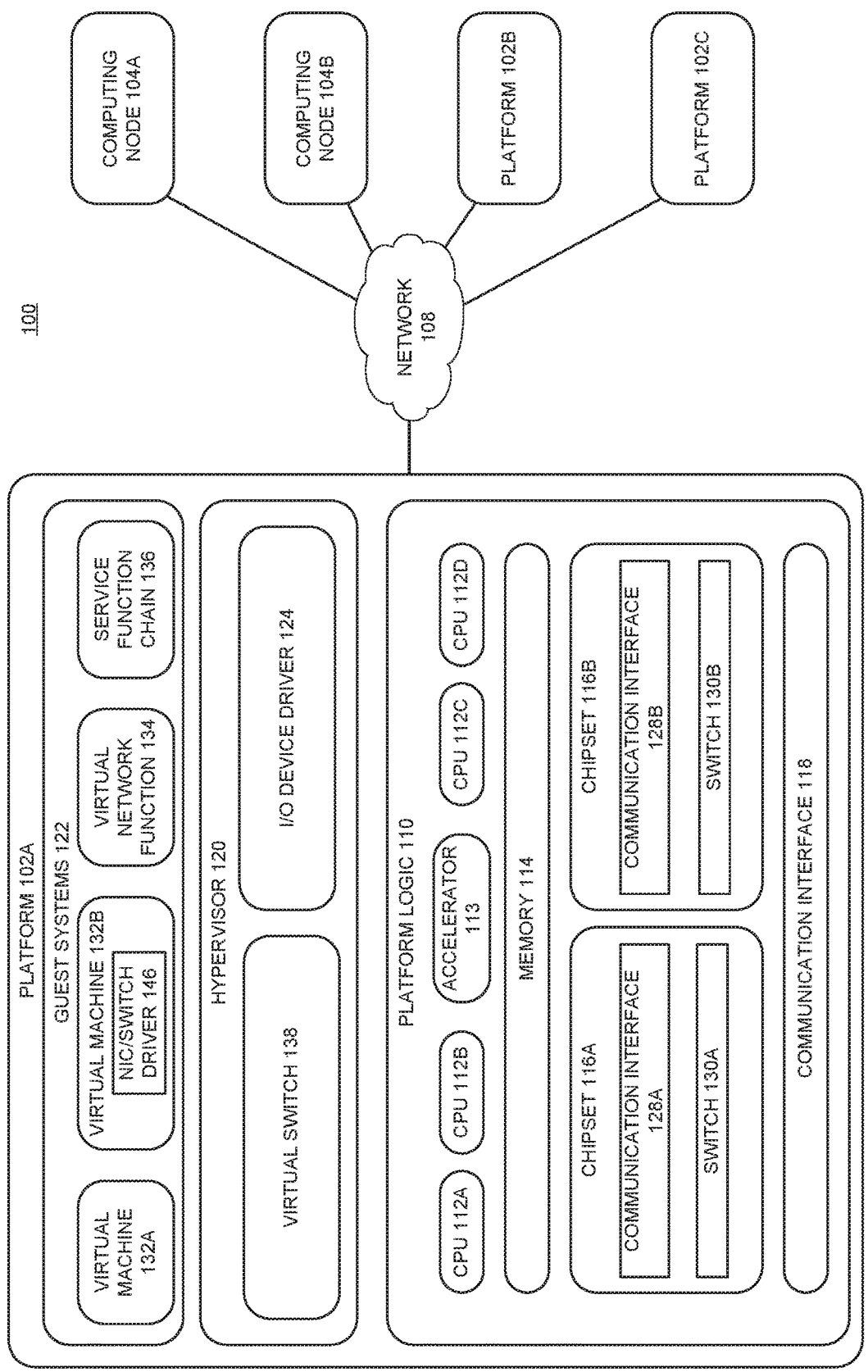
FIG. 1 illustrates a block diagram of components of a computing infrastructure in accordance with certain embodiments.

FIG. 1 illustrates a block diagram of components of a computing infrastructure 100 in accordance with certain embodiments. In the embodiment depicted, computing infrastructure 100 includes a plurality of platforms 102 and computing nodes 104 coupled together through network 108. A platform 102 may include platform logic 110 with one or more central processing units (CPUs) 112, memories 114 (which may include any number of different modules), chipsets 116, communication interfaces 118, and any other suitable hardware and/or software to execute a hypervisor 120 or other operating system capable of executing processes associated with applications running on platform 102. In some embodiments, a platform 102 may function as a host platform for one or more guest systems 122 that invoke these applications.

In various embodiments, computing infrastructure 100 may represent any suitable combination of compute hosts comprising various physical elements. For example, computing infrastructure 100 may comprise a datacenter, a communications service provider infrastructure (e.g., one or more portions of an Evolved Packet Core), an infrastructure of a cloud service provider, a corporate network, or other suitable computing infrastructure comprising a group of compute hosts.

A platform 102 may include one or more network interface controllers (NICs) that allow components of the platform (e.g., a CPU 112 or a memory 114) to communicate with a network 108 (and nodes coupled to the network such as computing nodes 104 or other platforms 102). A NIC may receive a data packet from the network, process the data packet, generate a receive descriptor based on information within the data packet, and forward the data packet and the receive descriptor to one or more other components of the platform 102 (e.g., CPU 112 and/or memory 114). A receive descriptor may aid the target (e.g., a guest system 122 such as a virtual machine (VM) 132) of the data packet in processing the data packet. In various systems, NICs do not provide virtualization of receive descriptors. That is, the receive descriptors generated by the NIC all have a single fixed format including general packet information such as, for example, a packet type, a packet length, and a virtual local area network (VLAN) ID. However, in many situations the NIC processes context information (or is capable of processing context information) of the packet that could be used by the target to more efficiently process received packets. However, when such information is not placed in the receive descriptor, the target (e.g., via software running on a CPU 112) may repeat processing stages previously performed in the NIC in order to reproduce the same context information of the packet that was lost on the boundary between the NIC and the target.

Various embodiments of the present disclosure may provide virtualized receive descriptors. That is, any number of guest systems 122 may each specify one or more customized formats of the receive descriptors provided by the NIC to the respective guest system for data packets to be consumed by the guest system. Thus, a VM, virtual network function (VNF), service function chain (SFC) 136, or other guest system running on platform 102A may request (e.g., in a receive descriptor profile) that customized packet context or metadata be placed in receive descriptors destined for the VM, VNF, or SFC. The NIC stores the customized receive descriptor profiles and builds receive descriptors in accordance with the receive descriptor profiles and provides these receive descriptors along with data packets to the respective guest systems. Accordingly, the logic that builds the receive descriptors is virtualized among the various guest systems 122 of the platform 102.

Various embodiments of the present disclosure may provide various technical advantages, such as improvement in packet processing performance on the platform 102, a reduction in CPU cycles used to process data packets (i.e., improvement in CPU utilization), and quicker processing of data packets.

Each platform 102 may include platform logic 110. Platform logic 110 comprises, among other logic enabling the functionality of platform 102, one or more CPUs 112, memory 114, one or more chipsets 116, and communication interface 118. Although three platforms are illustrated, computing infrastructure 100 may include any suitable number of platforms. In various embodiments, a platform 102 may reside on a circuit board that is installed in a chassis, rack, or other suitable structure that comprises multiple platforms coupled together through network 108 (which may comprise, e.g., a rack or backplane switch).

CPUs 112 may each comprise any suitable number of processor cores. The cores may be coupled to each other, to memory 114, to at least one chipset 116, and/or to communication interface 118, through one or more controllers residing on CPU 112 and/or chipset 116. In particular embodiments, a CPU 112 is embodied within a socket that is permanently or removeably coupled to platform 102. CPU 112 is described in further detail below in connection with FIG. 5. Although four CPUs are shown, a platform 102 may include any suitable number of CPUs.

Accelerator 113 may comprise any suitable logic to perform specialized processing tasks on behalf of one or more CPUs. Any specialized processing tasks may be performed by accelerator 113, such as graphics processing, cryptography operations, mathematical operations, TCP/IP processing, or other suitable functions. In particular embodiments, accelerator 113 may be coupled to one or more CPUs 112 via a dedicated interconnect. In particular embodiments, accelerator 113 may comprise programmable logic gates. For example, accelerator 113 may be an field-programmable gate array (FPGA). In various embodiments, the accelerator 113 may be located on the same chip as a CPU 112 or on a different chip.

Memory 114 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 114 may be used for short, medium, and/or long term storage by platform 102. Memory 114 may store any suitable data or information utilized by platform logic 110, including software embedded in a computer readable medium, and/or encoded logic incorporated in hardware or otherwise stored (e.g., firmware). Memory 114 may store data that is used by cores of CPUs 112. In some embodiments, memory 114 may also comprise storage for instructions that may be executed by the cores of CPUs 112 or other processing elements (e.g., logic resident on chipsets 116) to provide functionality associated with platform logic 110. Additionally or alternatively, chipsets 116 may each comprise memory that may have any of the characteristics described herein with respect to memory 114. Memory 114 may also store the results and/or intermediate results of the various calculations and determinations performed by CPUs 112 or processing elements on chipsets 116. In various embodiments, memory 114 may comprise one or more modules of system memory coupled to the CPUs through memory controllers (which may be external to or integrated with CPUs 112). In various embodiments, one or more particular modules of memory 114 may be dedicated to a particular CPU 112 or other processing device or may be shared across multiple CPUs 112 or other processing devices.

A platform 102 may also include one or more chipsets 116 comprising any suitable logic to support the operation of the CPUs 112. In various embodiments, chipset 116 may reside on the same package as a CPU 112 or on one or more different packages. Each chipset may support any suitable number of CPUs 112. A chipset 116 may also include one or more controllers to couple other components of platform logic 110 (e.g., communication interface 118 or memory 114) to one or more CPUs. Additionally or alternatively, the CPUs 112 may include integrated controllers. For example, communication interface 118 could be coupled directly to CPUs 112 via integrated I/O controllers resident on each CPU.

Chipsets 116 also each include a communication interface 128. Communication interface 128 may be used for the communication of signaling and/or data between chipset 116 and one or more I/O devices, one or more networks 108, and/or one or more other devices coupled to network 108 (e.g., platforms 102 or computing nodes 104). For example, communication interface 128 may be used to send and receive network traffic such as data packets. In a particular embodiment, communication interface 128 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 116 and another device coupled to network 108. In some embodiments, network 108 may comprise a switch with bridging and/or routing functions that is external to the platform 102 and operable to couple various NICs distributed throughout the computing infrastructure 100 (e.g., on different platforms) to each other. In various embodiments a NIC may be integrated with the chipset (i.e., may be on the same integrated circuit or circuit board as the rest of the chipset logic) or may be on a different integrated circuit or circuit board that is electromechanically coupled to the chipset. In some embodiments, communication interface 128 may also allow I/O devices integrated with or external to the platform (e.g., disk drives, other NICs, etc.) to communicate with the CPU cores.

Switch 130 may couple to various ports (e.g., provided by NICs) of communication interface 128 and may switch data between these ports and various components of chipset 116 (e.g., one or more Peripheral Component Interconnect Express (PCIe) lanes coupled to CPUs 112). Switch 130 may be a physical or virtual (i.e., software) switch.

Platform logic 110 may include an additional communication interface 118. Similar to communication interface 128, communication interface 118 may be used for the communication of signaling and/or data between platform logic 110 and one or more networks 108 and one or more devices coupled to the network 108. For example, communication interface 118 may be used to send and receive network traffic such as data packets. In a particular embodiment, communication interface 118 comprises one or more physical NICs. These NICs may enable communication between any suitable element of platform logic 110 (e.g., CPUs 112 or memory 114) and another device coupled to network 108 (e.g., elements of other platforms or remote computing devices coupled to network 108 through one or more networks). In particular embodiments, communication interface 118 may allow devices external to the platform (e.g., disk drives, other NICs, etc.) to communicate with the CPU cores. In various embodiments, NICs of communication interface 118 may be coupled to the CPUs through I/O controllers (which may be external to or integrated with CPUs 112).

In various embodiments, platform 102 may execute any number of guest systems 122. A guest system may comprise a single virtual machine (e.g., virtual machine 132a or 132b) or multiple virtual machines operating together (e.g., a virtual network function (VNF) 134 or a service function chain (SFC) 136). As depicted, various embodiments may include a variety of types of guest systems 122 present on the same platform 102.

A virtual machine 132 may emulate a computer system with its own dedicated hardware. A virtual machine 132 may run a guest operating system on top of the hypervisor 120. The components of platform logic 110 (e.g., CPUs 112, memory 114, chipset 116, and communication interface 118) may be virtualized such that it appears to the guest operating system that the virtual machine 132 has its own dedicated components.

A virtual machine 132 may include a virtualized NIC (vNIC), which is used by the virtual machine as its network interface. A vNIC may be assigned a media access control (MAC) address, thus allowing multiple virtual machines 132 to be individually addressable in a network.

VNF 134 may comprise a software implementation of a functional building block with defined interfaces and behavior that can be deployed in a virtualized infrastructure. In particular embodiments, a VNF 134 may include one or more virtual machines 132 that collectively provide specific functionalities (e.g., wide area network (WAN) optimization, virtual private network (VPN) termination, firewall operations, load-balancing operations, security functions, etc.). A VNF 134 running on platform logic 110 may provide the same functionality as traditional network components implemented through dedicated hardware. For example, a VNF 134 may include components to perform any suitable NFV workloads, such as virtualized Evolved Packet Core (vEPC) components, Mobility Management Entities, 3rd Generation Partnership Project (3GPP) control and data plane components, etc.

SFC 136 is group of VNFs 134 organized as a chain to perform a series of operations, such as network packet processing operations. Service function chaining may provide the ability to define an ordered list of network services (e.g. firewalls, load balancers) that are stitched together in the network to create a service chain.

A hypervisor 120 (also known as a virtual machine monitor) may comprise logic to create and run guest systems 122. The hypervisor 120 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 110. Services of hypervisor 120 may be provided by virtualizing in software or through hardware assisted resources that require minimal software intervention, or both. Multiple instances of a variety of guest operating systems may be managed by the hypervisor 120. Each platform 102 may have a separate instantiation of a hypervisor 120.

Hypervisor 120 may be a native or bare-metal hypervisor that runs directly on platform logic 110 to control the platform logic and manage the guest operating systems. Alternatively, hypervisor 120 may be a hosted hypervisor that runs on a host operating system and abstracts the guest operating systems from the host operating system. Various embodiments may include one or more non-virtualized platforms 102, in which case any suitable characteristics or functions of hypervisor 120 described herein may apply to an operating system of the non-virtualized platform.

Hypervisor 120 may include a virtual switch 138 that may provide virtual switching and/or routing functions to virtual machines of guest systems 122. The virtual switch 138 may comprise a logical switching fabric that couples the vNICs of the virtual machines 132 to each other, thus creating a virtual network through which virtual machines may communicate with each other. Virtual switch 138 may also be coupled to one or more networks (e.g., network 108) via physical NICs of communication interface 118 so as to allow communication between virtual machines 132 and one or more network nodes external to platform 102 (e.g., a virtual machine running on a different platform 102 or a node that is coupled to platform 102 through the Internet or other network). Virtual switch 138 may comprise a software element that is executed using components of platform logic 110. In various embodiments, hypervisor 120 may be in communication with any suitable entity (e.g., a SDN controller) which may cause hypervisor 120 to reconfigure the parameters of virtual switch 138 in response to changing conditions in platform 102 (e.g., the addition or deletion of virtual machines 132 or identification of optimizations that may be made to enhance performance of the platform).

Hypervisor 120 may include any suitable number of I/O device drivers 124. I/O device driver 124 represents one or more software components that allow the hypervisor 120 to communicate with a physical I/O device. In various embodiments, the underlying physical I/O device may be coupled to any of CPUs 112 and/or memory 114 and may send data to and receive data from CPUs 112 and/or memory 114. The underlying I/O device may utilize any suitable communication protocol, such as PCI, PCIe, Universal Serial Bus (USB), Serial Attached SCSI (SAS), Serial ATA (SATA), InfiniBand, Fibre Channel, an IEEE 802.3 protocol, an IEEE 802.11 protocol, or other current or future signaling protocol.

The underlying I/O device may include one or more ports operable to communicate with cores of the CPUs 112 and/or memory 114. In one example, the underlying I/O device is a physical NIC or physical switch. For example, in one embodiment, the underlying I/O device of I/O device driver 124 is a NIC of communication interface 118 having one or more ports (e.g., Ethernet ports). In other embodiments, underlying I/O devices may include any other suitable device capable of transferring data to and receiving data from CPUs 112 or memory 114, such as an audio/video (A/V) device controller (e.g., a graphics accelerator or audio controller); a data storage device controller, such as a flash memory device, magnetic storage disk, or optical storage disk controller; a wireless transceiver; a network processor; or a controller for another input device such as a monitor, printer, mouse, keyboard, or scanner; or other suitable device.

The elements of platform logic 110 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computing infrastructure 100 may be coupled together in any suitable, manner such as through one or more networks 108. A network 108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium. In various embodiments, guest systems 122 may communicate with computing nodes that are external to the computing infrastructure 100 through network 108. A computing node 104 may be any computing device operable to exchange data packets with one or more guests systems 122 and may comprise any suitable hardware (e.g., at least one processor and memory) and software.

Figure 2:
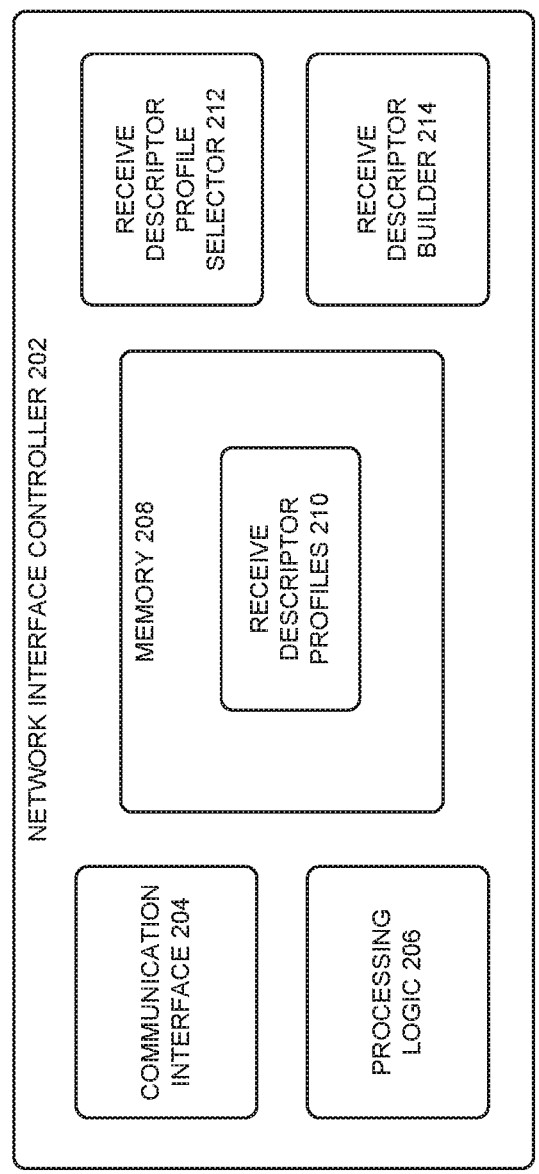
FIG. 2 illustrates a block diagram of a network interface controller in accordance with certain embodiments.

FIG. 2 illustrates a block diagram of a network interface controller (NIC) 202 in accordance with certain embodiments. In the embodiment depicted, NIC 202 comprises a communication interface 204, processing logic 206, memory 208, receive descriptor profiles 210, receive descriptor profile selector 212, and receive descriptor builder 214.

Communication interface 204 may be used to communicate data (e.g., data packets) between NIC 202 and one or more networks 108 and/or network nodes. The communication interface may send and receive data and/or signals according to any suitable standard such as an InfiniBand based standard, Gigabit Ethernet (or other IEEE 802.3 standard), IEEE 802.11 standard, or other suitable wired or wireless standard. Communication interface 204 may include any suitable logic, such as a transmitter and a receiver. A transmitter may receive data and transmit a representation of the data over a communication channel. A receiver may receive data from a communication channel, process the data, and provide the processed data to one or more other components of NIC 202 (e.g., to processing logic 206). In particular embodiments, a transmitter may include a source encoder (e.g., to compress source data), a channel encoder (e.g., to introduce redundancy into data to be transmitted in order to overcome noise and interference in the communication channel), and/or a digital modulator (e.g., to map a binary information sequence into a signal waveform). In particular embodiments, a receiver may include a digital demodulator (e.g., to process a received waveform and reduce the waveform to an estimation of a transmitted data symbol), a channel decoder (e.g., to use the redundancy in received data to fill in positions when the demodulator couldn't resolve a waveform), and/or a source decoder (e.g., to receive a signal and use knowledge about encoding performed by the source encoder to reconstruct the original information). Communication interface may also comprise one or more wired or wireless communication ports.

Processing logic 206 may include any suitable logic for processing a received data packet. During the processing, processing logic 206 may generate data packet context information that may include parameters parsed from the data packet, metadata based off of such parameters, or other information associated with the data packet.

In various embodiments, processing logic may parse various packet context parameters from the packet. Typically, these parameters are included in one or more headers of the packet, but they may alternatively be located in a payload portion of the packet. Any suitable parameters may be parsed from the packet, such as a length of a packet (e.g., in bytes), a length of a packet header, one or more source addresses (e.g., Internet Protocol (IP) address, media access control (MAC) address, or other address), one or more destination address (e.g., IP address, MAC address, or other address), one or more protocol identifiers (e.g., UDP, TCP, IPv4, IPv6, or other protocol), one or more ports (e.g., Open Systems Interconnection (OSI) model layer 4 source and/or destination ports) associated with the packet, a VLAN identifier, a Virtual eXtensible Local Area Network (VX-LAN) Network Identifier, one or more priorities of the packet (e.g., a quality of service (QoS) value), a packet identifier (e.g., a unique identifier used during reassembly of fragmented datagrams), error information (e.g., a checksum of the header), or other suitable parameters of the packet.

Processing logic 206 may determine a target of the packet based on one or more of the parsed parameters. In various embodiments, the target may be a guest system 122 or hypervisor 120. The target may be determined in any suitable manner. In one example, the target may be determined based on one or more table lookups using one or more parameters parsed from the packet (or values derived therefrom) as input values. In various embodiments, the tables are implemented in configurable logic (such that they may be adapted as guest systems 122 are created, removed, or reconfigured).

In particular embodiments, during the processing of the packet, processing logic 206 may generate any suitable metadata associated with the packet based on the parsed parameter values. As one example, the processing logic may determine a destination queue identifier which identifies a destination queue associated with the packet. A destination queue may be a location in memory of the platform (e.g., memory 114) into which the packet and/or a receive descriptor built for the packet is placed. A guest system 122 may be associated with any suitable number of destination queues. In particular embodiments, a destination queue is dedicated to a particular guest system 122. A guest system 122 may retrieve the packet and/or receive descriptor from the destination queue when the guest system 122 is ready to process the packet. As another example, the processing logic 206 may generate metadata that may be used in, for example, packet steering. For example, the processing logic 206 may perform a hash on one or more of the parsed parameters (e.g., IP addresses, port numbers, or other parameters) and the hash may be used to determine the CPU 112 and/or core that should process the packet. As another example, the processing logic 206 may generate metadata comprising an identifier of the ingress port of the NIC on which the packet was received. As another example, the processing logic 206 may generate metadata comprising parsing hints. A parsing hint may include data indicating where a particular portion of a packet is located within the packet. For example, a parsing hint might include an offset to a specified portion of the packet, such as any header included within the packet or a field within a particular header. As just one example, the metadata may include an offset to a service chain header (e.g., as defined at https://tools.ietf.org/html/draft-zhang-sfc-sch-03) or one or more offsets to fields of the service chain header. In various embodiments the service chain header may allow a VNF providing service function forwarding (SFF) to determine a next hop of the packet. As yet another example, such metadata may include a binary indication of whether one or more particular parameters (e.g., addresses) matched specified parameters. As another example, the processing logic 206 may generate application-specific opaque metadata that was programmed into NIC 202 by hypervisor 120 or a guest system 122. In various embodiments, this opaque metadata may be associated with entries in lookup tables of the NIC 202, such as flow entries. In particular embodiments, this opaque metadata may indicate a structure of an associated receive descriptor (e.g., a receive descriptor that is selected based on the flow lookup).

Memory 208 may comprise any form of volatile or non-volatile memory such as the examples described above with respect to memory 114. Memory 208 may store any suitable data or information utilized by NIC 202, including software embedded in a computer readable medium, and/or encoded logic incorporated in hardware or otherwise stored (e.g., firmware). In some embodiments, memory 208 may also store instructions or other values used to configure processing logic 206 or other processing elements of the NIC 202. Memory 208 may also store the results and/or intermediate results of the various calculations and determinations performed by processing logic 206 or other processing elements of NIC 202.

In a particular embodiment, receive descriptor profiles 210 may be stored by memory 208. A receive descriptor profile may be generated by any suitable entity, such as a guest system 122, a hypervisor 120, accelerator 113, or a component within network controller 202 (e.g., the receive descriptor profile may include pipeline rules). A receive descriptor profile may be sent to the NIC 202 by any suitable entity, such as a guest system 122, hypervisor 120 (which may also create and/or send receive descriptor profiles 210 to the NIC 202 on behalf of a guest system 122), or accelerator 113. A receive descriptor profile 210 defines the format of a receive descriptor. Thus, a receive descriptor profile 210 may specify any packet context information (e.g., as described above) such as one or more packet context parameters or metadata generated by the processing logic 206 to include in receive descriptors generated based on that profile. In various embodiments, the receive descriptor profile may specify the ordering of the contents of receive descriptors built based on that profile. In some embodiments, the receive descriptor profile may specify how a parameter or other metadata of a receive descriptor is to be encoded (e.g., by specifying the bit length and/or method of encoding).

In particular embodiments, a set of receive descriptor profiles 210 may be entity specific. That is, a receive descriptor profile 210 is to be used to build receive descriptors for data packets destined to a particular software entity (e.g., a guest system 122 or hypervisor 120), accelerator 113, or other consumer of data packets. A receive descriptor profile specific to a software entity may be generated by that software entity or other suitable entity (e.g., by providing instructions to a CPU 112 or by initiating another process used to create receive descriptor profiles). For example, in various embodiments, a receive descriptor profile 210 includes selection criteria indicating whether the receive descriptor profile 210 should be used to build a receive descriptor (i.e., the selection criteria indicates which data packets the receive descriptor profile matches). Any suitable selection criteria may be used such as any combination of the data packet context information described above. For example, a receive descriptor profile 210 may specify that when a packet is to be placed in one or more specified destination queues (e.g., dedicated to a particular VM or other guest system 122 or hypervisor 120), the receive descriptor profile 210 should be used. As another example, a receive descriptor profile 210 may specify that when the packet specifies a particular destination address (e.g., a MAC address or an IP address) or combination of addresses corresponding to a software entity (e.g., a guest system 122 or hypervisor 120) that the receive descriptor profile should be used. As another example, a receive descriptor profile 210 may specify that when a hash performed on a combination of packet context parameters (e.g., a destination IP address and MAC address) equals a particular value, the receive descriptor profile should be used. As another example, a receive descriptor profile 210 may specify that when a packet specifies a particular destination host interface the receive descriptor profile should be used (e.g., if the NIC serves multiple isolated hosts over, e.g., multiple PCIe host interfaces where each host may run its own hypervisor or operating system). As another example, a receive descriptor profile 210 may specify that when a packet specifies a particular destination VM number, the receive descriptor profile should be used. In various embodiment, the virtual machines 132 running on a platform may be enumerated within the platform using a namespace. For example, VMs 132 may be enumerated by a PCIe function number and/or by an internal enumeration used by NIC 202 (e.g., a Virtual Station Interface).

In various embodiments, the particular selection criteria that is used within the entity specific receive descriptor profiles is uniform across all such receive descriptor profiles. For example, the selection criteria for all receive descriptor profiles specific to the software entities may be the destination queue assigned to a received packet. Thus when a software entity generates a receive descriptor profile to be used for packets for which the software entity is the target, one or more destination queues associated with the software entity are included as the selection criteria in the receive descriptor profile. Other uniform criteria (e.g., one or more destination addresses, information derived therefrom (e.g., a hash value), or other identifiers associated with the targets of the packets) may be used for all of the entity specific receive descriptor profiles. Uniform selection criteria across the entity specific receive descriptor profiles may simplify the logic used to select the receive descriptor profiles, since the same criteria is evaluated for each packet. In various embodiments, one of the VMs 132 or the hypervisor 120 may specify the uniform criteria to be used for all of the entity specific receive descriptor profiles.

In particular embodiments, a set of general purpose receive descriptor profiles that are not specific to a particular software entity (but may apply to a subset of the software entities or to all of the software entities) may also be stored in memory 208. The general purpose receive descriptor profiles may also include selection criteria indicating when each general purpose receive descriptor profile matches a data packet. For example, a receive descriptor profile 210 may specify that when packets match a particular protocol (e.g., TCP), the receive descriptor profile 210 should be used. As another example, a general purpose receive descriptor profile 210 may specify that when packets match a particular VLAN or VXLAN identifier the receive descriptor profile should be used. A general purpose receive descriptor profile may be generated by a software entity (e.g., a guest system 122 or hypervisor 120) or other suitable entity of the platform 102.

In various embodiments, the selection criteria of a receive descriptor profile 210 may also include a priority of the receive descriptor profile 210. The priority may indicate a relative priority of the receive descriptor profile 210 with respect to other receive descriptor profiles 210. In a particular embodiment, a default receive descriptor profile 210 may be set to apply to all packets, but have the lowest possible priority such that if another receive descriptor profile 210 matches a data packet, that receive descriptor profile 210 will be used instead of the default descriptor profile 210 (alternatively, the default receive descriptor profile 210 may be used if no matching receive descriptor profiles are found for a data packet). In a particular embodiment, any suitable entity (e.g., the guest system 122 that generates the receive descriptor profile or hypervisor 120) may specify the priority. For example, in one embodiment, hypervisor 120 may assign the priority for receive descriptor profiles 210 generated by guest systems 122 in order to achieve platform-wide optimizations.

Receive descriptor profile selector 212 includes logic to select a receive descriptor profile 210 to be used to build a receive descriptor for a received packet. The receive descriptor profile selector 212 may determine whether one or more of the receive descriptor profiles 210 match the packet (i.e., the selection criteria specified in the profiles is met). If multiple receive descriptor profiles 210 match a particular packet, the selector 212 merges the descriptor profiles (i.e., selects one of the profiles) based on any suitable criteria (e.g., the relative priorities associated with the descriptor profiles, which entity generated the descriptor profiles, or other suitable criteria). In various embodiments, a default receive descriptor profile 210 may be used if no other receive descriptor profiles 210 match the packet.

In a particular embodiment, a portion of the logic may determine which (if any) receive descriptor profile of the entity specific receive descriptor profiles match the packet. Another portion of the logic may determine whether any general purpose receive descriptors match the packet. If both portions of the logic return at least one receive descriptor (more than one general purpose receive descriptor profile could be returned in some situations), then the receive descriptors are merged (i.e., one receive descriptor is selected).

After a receive descriptor profile 210 is selected, the profile is accessed (e.g., via a table lookup based on an identifier of the selected received descriptor profile or via other means) and the receive descriptor is generated by receive descriptor builder 214. The content specified by the receive descriptor profile is generated and formatted in the manner specified by the receive descriptor profile 210 to form a receive descriptor for the data packet. The receive descriptor builder 214 may include any suitable logic to receive indications of selected receive descriptor profiles 210, access the selected receive descriptor profiles, access data packet context information specified by the receive descriptor profiles (such as packet context parameters or metadata generated by processing logic 206), and build receive descriptors based on the profiles and the accessed content.

Once the receive descriptor is built, it is made available to the target of the packet (e.g., guest system 122 or hypervisor 120) in any suitable manner. As one example, the receive descriptor may be written to memory 114 at a location associated with the target (e.g., a queue for the target). The packet is also provided to the target in any suitable manner (such as by being written to another location of memory 114 accessible by the target). In various embodiments, the receive descriptor may be stored with a pointer to the data packet associated with the receive descriptor. As another example, the receive descriptor and/or the data packet may be provided directly to a CPU 112 that is performing operations (e.g., executing instructions) for the guest system 122 or hypervisor 120).

Figure 3:
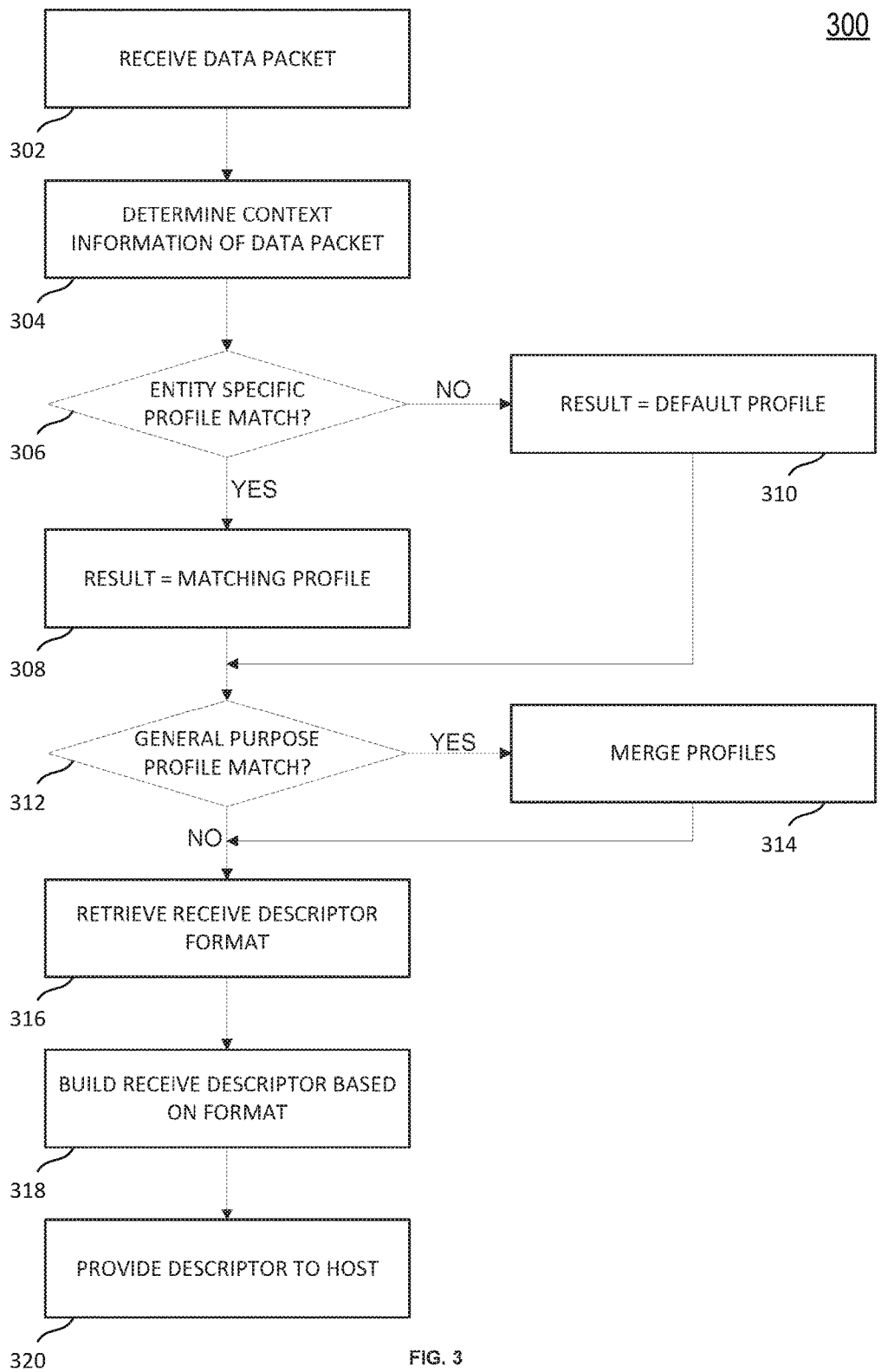
FIG. 3 illustrates an example flow for building virtualized receive descriptors in accordance with certain embodiments.

FIG. 3 illustrates an example flow 300 for building virtualized receive descriptors in accordance with certain embodiments. The flow 300 depicts example operations that may be performed by any suitable logic, such as one or more components of a network interface controller 202. At 302, a data packet is received (e.g., from a network 108). At 304, context information associated with the data packet is determined. At 306, it is determined whether there are any entity specific receive descriptor profile matches for the received data packet. For example, a first portion of the context information may be compared against selection criteria specified in entity specific receive descriptor profiles to determine whether any of the entity specific receive descriptor profiles specifies one or more selection criteria that matches the context information. If a profile does match, the result of this stage is assigned to the matching profile at 308. If no entity specific profile matches the context information, a default receive descriptor profile is assigned to the result at 310.

At 312, it is determined whether one or more general purpose receive descriptor profiles match the data packet. In various embodiments, the context information of the packet that is compared against selection criteria specified by the general purpose receive descriptor profiles may be different from the context information that is compared against selection criteria specified by the entity specific receive descriptor profiles. At 312, if one or more of the general purpose receive descriptor profiles match the data packet, then a merge operation is performed at 314 in which one receive descriptor profile is selected (either an entity specific profile or a general purpose profile). In a particular embodiment, the receive descriptor profile with the highest specified priority is selected at 314.

At 316, a format specified by the selected receive descriptor profile is retrieved. The format may specify the content (i.e., data packet context information) to be included in the receive descriptor. Optionally, the format may also include ordering information and/or formatting information. At 318, a receive descriptor is built based on the retrieved format. The receive descriptor may have any suitable data packet context information (and in some embodiments may even include data packet context information that was used to select the receive descriptor profile). At 320, the receive descriptor is provided to a host (e.g., a CPU 112 and/or memory 114) for use by the target of the packet.

The flow described in FIG. 3 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 3 may be repeated, combined, modified or deleted where appropriate. Additionally, operations may be performed in any suitable order without departing from the scope of particular embodiments.

Figure 4:
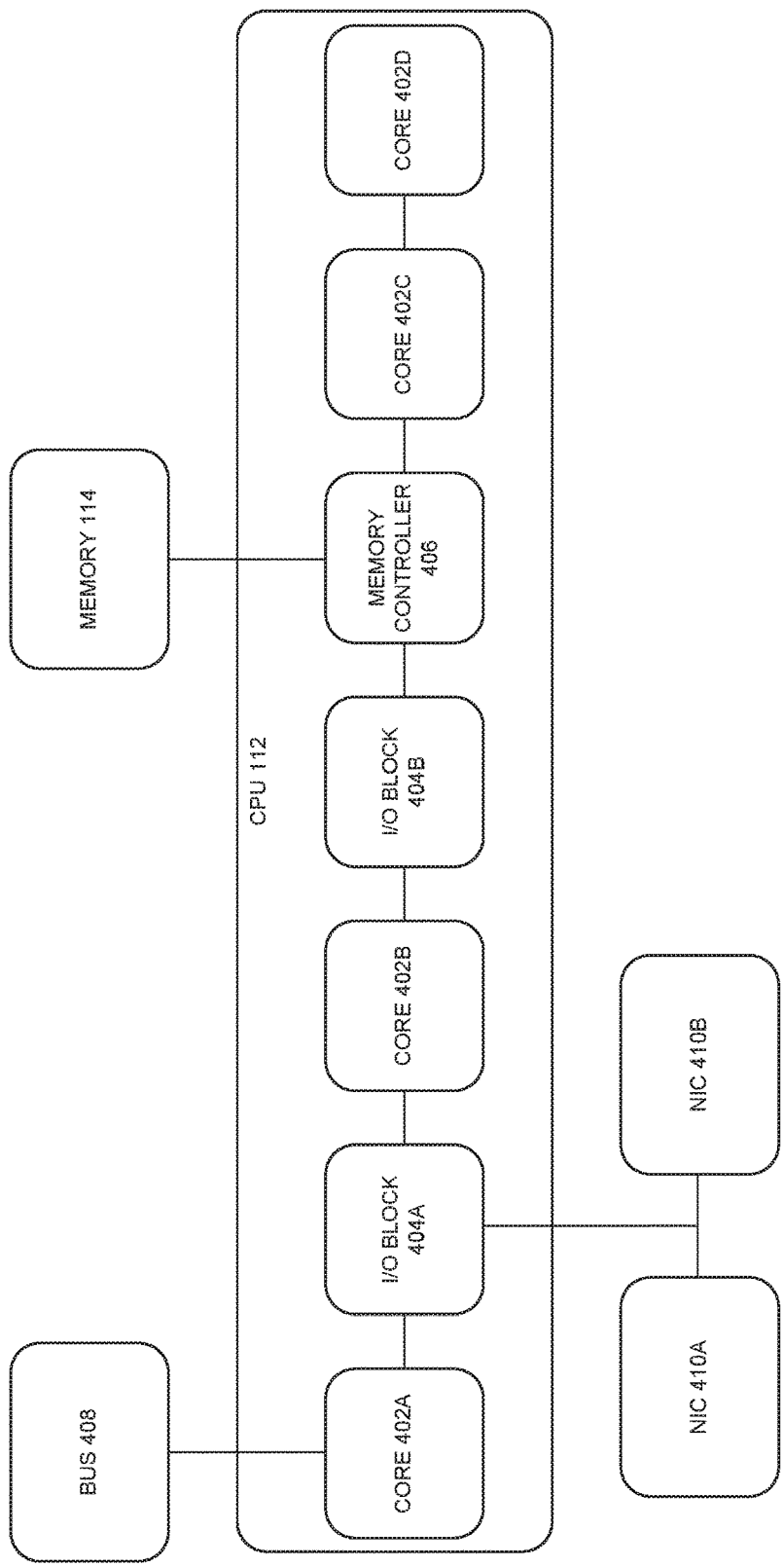
FIG. 4 illustrates a block diagram of a central processing unit (CPU) coupled to various other components of a platform in accordance with certain embodiments.

FIG. 4 illustrates a block diagram of a central processing unit (CPU) 112 coupled to various other components of platform 102 in accordance with certain embodiments. Although CPU 112 depicts a particular configuration, the cores and other components of CPU 112 may be arranged in any suitable manner. CPU 112 may comprise any processor or processing device, such as a microprocessor, an embedded processor, a digital signal processor (DSP), a network processor, an application processor, a co-processor, a system on a chip (SOC), or other device to execute code. CPU 112, in the depicted embodiment, includes four processing elements (cores 402 in the depicted embodiment), which may include asymmetric processing elements or symmetric processing elements. However, CPU 112 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical CPU 112, as illustrated in FIG. 4, includes four cores—cores 402A, 402B, 402C, and 402D, though a CPU may include any suitable number of cores. Here, cores 402 may be considered symmetric cores. In another embodiment, cores may include one or more out-of-order processor cores or one or more in-order processor cores. However, cores 402 may be individually selected from any type of core, such as a native core, a software managed core, a core adapted to execute a native Instruction Set Architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

A core 402 may include a decode module coupled to a fetch unit to decode fetched elements. Fetch logic, in one embodiment, includes individual sequencers associated with thread slots of cores 402. Usually a core 402 is associated with a first ISA, which defines/specifies instructions executable on core 402. Often machine code instructions that are part of the first ISA include a portion of the instruction (referred to as an opcode), which references/specifies an instruction or operation to be performed. The decode logic may include circuitry that recognizes these instructions from their opcodes and passes the decoded instructions on in the pipeline for processing as defined by the first ISA. For example, as decoders may, in one embodiment, include logic designed or adapted to recognize specific instructions, such as transactional instructions. As a result of the recognition by the decoders, the architecture of core 402 takes specific, predefined actions to perform tasks associated with the appropriate instruction. It is important to note that any of the tasks, blocks, operations, and methods described herein may be performed in response to a single or multiple instructions; some of which may be new or old instructions. Decoders of cores 402, in one embodiment, recognize the same ISA (or a subset thereof). Alternatively, in a heterogeneous core environment, a decoder of one or more cores (e.g., core 402B) may recognize a second ISA (either a subset of the first ISA or a distinct ISA).

In various embodiments, cores 402 may also include one or more arithmetic logic units (ALUs), floating point units (FPUs), caches, instruction pipelines, interrupt handling hardware, registers, or other suitable hardware to facilitate the operations of the cores 402.

Bus 408 may represent any suitable interconnect coupled to CPU 112. In one example, bus 408 may couple CPU 112 to another CPU of platform logic 102 (e.g., via Quick Path Interconnect). I/O blocks 404 represent interfacing logic to couple I/O devices (e.g., NICs 410) to cores of CPU 112 and memory 114. In various embodiments, an I/O block 404 may include an I/O controller that is integrated onto the same package as cores 402 or may simply include interfacing logic to couple to an I/O controller that is located off-chip. As one example, I/O blocks 404 may include PCIe interfacing logic. Similarly, memory controller 406 represents interfacing logic to couple memory 114 to cores of CPU 112. In various embodiments, memory controller 406 is integrated onto the same package as cores 402. In alternative embodiments, a memory controller may be located off chip.

Figure 5:
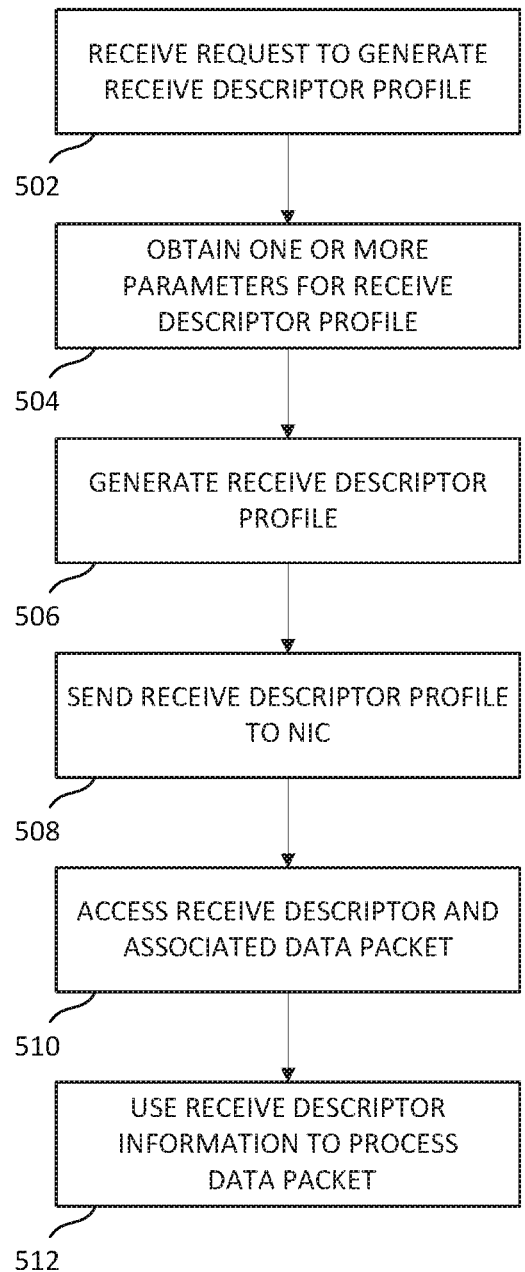
FIG. 5 illustrates an example flow for specifying a receive descriptor profile and processing data packets based on the receive descriptor profile in accordance with certain embodiments.

FIG. 5 illustrates an example flow 500 for specifying a receive descriptor profile and processing data packets based on the receive descriptor profile in accordance with certain embodiments. The flow 500 depicts example operations that may be performed by any suitable logic, such as one or more components of a processor, such as one or more CPU 112. In some embodiments, a CPU 112 may execute each operation of flow 500 while in other embodiments, the operations may be distributed among multiple CPUs (e.g., one CPU may generate the receive descriptor profile while another CPU processes the data packet based on the receive descriptor).

At 502, a request to generate a receive descriptor profile is received. The request may originate from any suitable entity, such as a guest system 122 or hypervisor 120. The request may be received as one or more software instructions that the guest system 122 or hypervisor 120 executes on a processor or in another suitable manner. At 504, one or more parameters for the receive descriptor profile are obtained. For example, one or more parameters associated with selection criteria for the receive descriptor profile may be obtained (e.g., one or more destination queues associated with the requesting entity or other identifying information of the requesting entity). As another example, a priority of the receive descriptor profile may be obtained (e.g., by executing one or more instructions associated with a hypervisor or communicating with another processor that executes instructions for the hypervisor). As another example, one or more parameters for the format to be specified by the receive descriptor profile may be obtained. If the request to generate the receive descriptor already includes all of the parameters for the receive descriptor profile, this flow may move from 502 directly to 506. At 506, the receive descriptor profile is generated and at 508 the receive descriptor profile is sent to a network interface controller.

At 510, a receive descriptor built in accordance with the receive descriptor profile is accessed (e.g., from a portion of memory 114). In some embodiments, the receive descriptor may be stored with a pointer in memory to the data packet for which the receive descriptor was built. This packet is also accessed and at 512, data packet context information included in the receive descriptor is used to process the data packet.

The flow described in FIG. 5 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 5 may be repeated, combined, modified or deleted where appropriate.

Additionally, operations may be performed in any suitable order without departing from the scope of particular embodiments.

FIG. 6 illustrates a block diagram of a system 600 for providing virtualized receive descriptors in accordance with certain embodiments. System 600 includes a plurality of computing devices 602 wirelessly coupled to network element 606, which may be further coupled to a network 604. Network 604 may have any of the characteristics described above with respect to network 108. Network element 606 may be any suitable computing node operable of receiving and/or generating data packets and directing the packets towards their target. For example, network element 606 may comprise a router that routes packets based on an IP address or other L3 address and/or a switch that bridges packets based on a MAC address or other L2 address. Network element 606 may comprise at least one NIC 608, which may have any of the characteristics of NIC 202. In various embodiments, network element 606 is able to generate (e.g., via NIC 608 or other logic) customized receive descriptors for computing devices 602.

A computing device 602 may include any suitable logic such as one or more processors, microcontrollers, or other processing elements to process data packets by utilizing information from receive descriptors sent with the data packets. In various embodiments, system 600 may include other computing devices that do not utilize receive descriptors when processing packets. In various embodiments, computing device may comprise any suitable device to communicate with network element 606 via a wireless or wired communication channel. As nonlimiting examples, computing device 602 may be a sensor, a home automation device, a security alarm, a television, a computer, a telephone, a wearable device, a media player, a home appliance, a video camera, a thermostat, a light, a smartphone, or other suitable computing device.

In particular embodiments, a computing device 602 may communicate a receive descriptor profile to the network element 606 to be used to generate customized receive descriptors for packets to be sent to the computing device 602. The network element 606 may store the receive descriptor profile in any suitable memory and use the receive descriptor profile to generate receive descriptors in association with packets destined for the computing device 602.

In various embodiments, a data packet addressed to one of the computing devices 602 may be received at network element 606 (or a data packet may be generated for a computing device 602 by the network element). The data packet may originate from any suitable source, such as another one of the computing devices 602, a computing device coupled to network 604, a computing device directly coupled to the network element 606, or other suitable computing device. The packet may be received through NIC 608, which may have any of the characteristics of NIC 202. In a manner similar to that of NIC 202, NIC 608 may be operable to process the packet and to build customized receive descriptors for the target computing device 602 and then transmit the packet and the customized receive descriptor to the target computing device 602. The target computing device 602 may utilize the customized receive descriptor in processing the received packet.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as a CPU 112, accelerator 113, memory 114, chipset 116, communication interface 118, 128, or 204, hypervisor 120, I/O device driver 124, guest system 122, NIC 202, processing logic 206, receive descriptor profile selector 212, receive descriptor builder 214, computing device 602, network element 606, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1 's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In one embodiment, a system comprises a network interface controller to determine context information associated with a data packet; select a receive descriptor profile from a plurality of receive descriptor profiles based upon a first portion of the context information; and build a receive descriptor for the data packet based upon a second portion of the context information and the selected receive descriptor profile.

In one embodiment, a method comprises determining context information associated with a data packet; selecting a receive descriptor profile from a plurality of receive descriptor profiles based upon a first portion of the context information; and building a receive descriptor for the data packet based upon a second portion of the context information and the selected receive descriptor profile.

In one embodiment, an apparatus comprises means for determining context information associated with a data packet; means for selecting a receive descriptor profile from a plurality of receive descriptor profiles based upon a first portion of the context information; and means for building a receive descriptor for the data packet based upon a second portion of the context information and the selected receive descriptor profile.

In various embodiments of the systems, methods, or apparatuses described herein: the receive descriptor profile is specified by a virtual machine, the receive descriptor profile is specified by a hypervisor, the first portion of the context information comprises a destination queue selected based on the data packet, the first portion of the context information comprises information based on at least one identifier associated with a software entity to which the data packet is addressed, the receive descriptor profile is selected from multiple receive descriptor profiles that match the data packet, the receive descriptor profile is selected from multiple receive descriptor profiles based on a priority of the receive descriptor profile, the receive descriptor comprises an offset from the beginning of the data packet to a particular header of the data packet, the receive descriptor comprises metadata obtained by processing information included within the data packet, and/or the data packet and the receive descriptor may be sent (e.g., by the network interface controller or other means) to a computing device across a wireless communication channel.

In one embodiment, a system comprises at least one processor to execute instructions on behalf of a guest system; generate a receive descriptor profile for the guest system; and access a data packet and a receive descriptor associated with the data packet, the receive descriptor formed in accordance with the receive descriptor profile.

In one embodiment, a method comprises executing instructions on behalf of a guest system; generating a receive descriptor profile for the guest system; and accessing a data packet and a receive descriptor associated with the data packet, the receive descriptor formed in accordance with the receive descriptor profile.

In one embodiment, an apparatus comprises means for executing instructions on behalf of a guest system; means for generating a receive descriptor profile for the guest system; and means for accessing a data packet and a receive descriptor associated with the data packet, the receive descriptor formed in accordance with the receive descriptor profile.

In various embodiments of systems, methods, or apparatuses described herein: the receive descriptor is built (e.g., by a network interface controller or other means) based on the receive descriptor profile; wherein the receive descriptor profile specifies data packet context information that is to be placed in receive descriptors built based on the receive descriptor profile; the receive descriptor profile specifies a format for the data packet context information; and/or the receive descriptor profile specifies one or more selection criteria including information to be compared to information obtained from data packets to determine whether the receive descriptor profile matches the data packets.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system comprising:
   a network interface controller to:
   receive an incoming data packet;
   determine that the packet is directed to a guest system of the system;
   select a receive descriptor profile associated with the guest system from a plurality of receive descriptor profiles;
   build a receive descriptor for the incoming data packet based upon extracted context information of the data packet and the selected receive descriptor profile, the receive descriptor comprising at least a portion of the extracted context information consumable by the guest system; and
   forward the incoming data packet to the guest system.

2. The system of claim 1, wherein the receive descriptor profile is specified by a virtual machine or a hypervisor.

3. The system of claim 1, wherein the receive descriptor profile is specified by an accelerator.

4. The system of claim 1, wherein the extracted context information comprises a destination queue selected based on the incoming data packet.

5. The system of claim 1, wherein the extracted context information comprises information based on at least one identifier associated with a software entity to which the incoming data packet is addressed.

6. The system of claim 1, wherein the receive descriptor profile is selected from multiple receive descriptor profiles that match the incoming data packet.

7. The system of claim 1, wherein the receive descriptor profile is selected from multiple receive descriptor profiles based on a priority of the receive descriptor profile.

8. The system of claim 1, wherein the receive descriptor comprises an offset from a beginning of the incoming data packet to a particular header of the incoming data packet.

9. The system of claim 1, wherein the receive descriptor comprises metadata obtained by processing information included within the incoming data packet.

10. The system of claim 1, wherein the network interface controller is further to send the incoming data packet and the receive descriptor to a computing device across a wireless communication channel.

11. A method comprising:
    receiving an incoming data packet;
    determining that the packet is directed to a guest system;

selecting a receive descriptor profile associated with the guest system from a plurality of receive descriptor profiles;

building a receive descriptor for the incoming data packet based upon extracted context information of the data packet and the selected receive descriptor profile, the receive descriptor comprising at least a portion of the extracted context information consumable by the guest system; and forwarding the incoming data packet to the guest system.

12. The method of claim 11, wherein the receive descriptor profile is specified by a virtual machine.

13. The method of claim 11, wherein the receive descriptor profile is specified by a hypervisor.

14. The method of claim 11, wherein the extracted context information comprises a destination queue selected based on the incoming data packet.

15. The method of claim 11, wherein the extracted context information comprises information based on at least one identifier associated with a software entity to which the incoming data packet is addressed.

16. A system comprising:

at least one processor to:

execute instructions on behalf of a guest system;

generate a receive descriptor profile for the guest system, the receive descriptor profile comprising information for compiling from extracted context information a receive descriptor comprising context Information consumable by the guest system; and access an incoming data packet and a receive descriptor associated with the incoming data packet, the receive descriptor formed in accordance with the receive descriptor profile.

17. The system of claim 16, further comprising a network interface controller to build the receive descriptor based on the receive descriptor profile.

18. The system of claim 16, wherein the receive descriptor profile specifies incoming data packet context information that is to be placed in receive descriptors built based on the receive descriptor profile.

19. The system of claim 18, wherein the receive descriptor profile specifies a format for the incoming data packet context information.

20. The system of claim 18, wherein the receive descriptor profile specifies one or more selection criteria including information to be compared to information obtained from Incoming data packets to determine whether the receive descriptor profile matches the incoming data packets.

21. A method comprising:

executing instructions on behalf of a guest system;

generating a receive descriptor profile for the guest system, the receive descriptor profile comprising information for compiling from extracted context information a receive descriptor comprising context information consumable by the guest system; and accessing an incoming data packet and a receive descriptor associated with the incoming data packet, the receive descriptor formed in accordance with the receive descriptor profile.

22. The method of claim 21, further comprising building the receive descriptor based on the receive descriptor profile.

23. The method of claim 21, wherein the receive descriptor profile specifies incoming data packet context information that is to be placed in receive descriptors built based on the receive descriptor profile.

24. The method of claim 23, wherein the receive descriptor profile specifies a format for the incoming data packet context information.

25. The method of claim 23, wherein the receive descriptor profile specifies one or more selection criteria including information to be compared to information obtained from incoming data packets to determine whether the receive descriptor profile matches the incoming data packets.

* * * * *

UNITED STATES PATENT AND TRADEMARK OFFICE
CERTIFICATE OF CORRECTION

PATENT NO. : 10,225,183 B2  
APPLICATION NO. : 15/170138  
DATED : March 5, 2019  
INVENTOR(S) : Ronen Chayat et al.

Page 1 of 1

It is certified that error appears in the above-identified patent and that said Letters Patent is hereby corrected as shown below:

In the Claims

In Column 21, Line 30, in Claim 16, delete "Information" and insert -- information --, therefor.

In Column 22, Line 11, in Claim 20, delete "Incoming" and insert -- incoming --, therefor.

Signed and Sealed this
Fourth Day of June, 2019

Andrei Iancu
*Director of the United States Patent and Trademark Office*